United States Patent Office 3,763,212
Patented Oct. 2, 1973

3,763,212
HYDROLYSIS OF ALKYLALKENYLDICHLORO-SILANE
Harry R. McEntee, Waterford, and John S. Razzano, Troy, N.Y., assignors to General Electric Company
No Drawing. Filed Feb. 4, 1972, Ser. No. 223,693
Int. Cl. C07f 7/08
U.S. Cl. 260—448.2 E                    10 Claims

ABSTRACT OF THE DISCLOSURE

Process for preparing cyclic sym-polyalkylpolyalkenylpolysiloxane such as 2,4,6,8-tetramethyl-2,4,6,8-tetravinylcyclotetrasiloxane by hydrolysis of alkylalkenyldichlorosilane in a medium containing water and certain organic liquids.

BACKGROUND OF THE INVENTION

Cyclic organopolysiloxanes have been found particularly valuable in the formation of organopolysiloxanes, especially long chain polymers. Exemplary of these long chain polymer raw materials which have proven invaluable are octamethylcyclotetrasiloxanes and hexaphenylcyclotrisiloxanes. Such materials may be homopolymerized to form long chain polymers with a single type of substituent on the silicon atoms of the chain, or they may be copolymerized to form organopolysiloxanes having silicon atoms substituted with differing groups.

It is often desirable to produce linear, long chain organopolysiloxanes which are readily cross-linkable. It has been found particularly advantageous to form such cross-linkable organopolysiloxanes by substituting some of the silicon atoms in the chain with a reactive group, such as the vinyl group. As with the octamethylcyclotetrasiloxane and hexaphenylcyclotrisiloxane, the most facile method of incorporating the vinyl substituted silicone members is through the co-equilibration of a small amount of sym-tetramethyltetravinylcyclotetrasiloxane with other cyclic materials, such as the octamethylcyclotetrasiloxane and hexaphenylcyclotrisiloxane.

Previous methods of forming sym-polyalkylpolyalkenylcyclopolysiloxanes have been extremely inefficient and/or very expensive and complicated. One such previously employed method involves the hydrolysis of the methylvinyldichlorosilane in the presence of water and 1,4-dioxane under certain conditions.

Such a process however is potentially quite hazardous. For instance, the dioxane is toxic and requires extraordinary safety precautions in handling. In addition, peroxides readily form in the dioxane which tend to cause polymerization of the cyclic polysiloxane through rupture of the vinyl bonds. Accordingly, it is usually necessary to incorporate a polymerization inhibitor. The use of dioxane is further unattractive from a commercial and economic viewpoint because it is a relatively expensive material.

Processes in addition to the above-mentioned process employing dioxane have been suggested for preparing certain polyalkylpolyalkenylpolysiloxanes. One such process involves a hydrolysis followed by a cracking operation which employs lithium hydroxide and certain polyethers such as tetraglyme to prepare 2,4,6,8-tetramethyl-2,4,6,8-tetravinylcyclotetrasiloxane. This process is somewhat more complicated than the one employing dioxane, and is potentially more hazardous than the dioxane process.

It is therefore an object of the present invention to provide a hydrolysis process which is less expensive than those suggested previously and which produces substantial quantities of the desired cyclic polysiloxane. In addition, it is an object of the present invention to provide a process which is significantly less hazardous than the above-discussed processes.

It is a further object of the present invention to provide a process for hydrolysis of alkylalkenyldichlorosilanes to the corresponding cyclic sym-polyalkylpolyalkenylpolysiloxanes which can easily be caarried out in a commercial facility. In addition, it is an object of the present invention to provide a process which does not necessitate the use of extraordinary safety precautions.

SUMMARY OF THE INVENTION

The process of the present invention is concerned with the preparation of cyclic sym-polyalkylpolyalkenylpolysiloxanes having the formula:

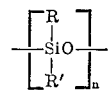

wherein R is a lower alkyl group having from 1 to 5 carbon atoms and R' is vinyl radical or allyl radical or methallyl radical; $n$ is an integer from 3 to 10 inclusive; by the hydrolysis of an alkylalkenyldichlorosilane having the formula:

$$RR'SiCl_2$$

wherein R and R' have the same meanings as defined above with respect to the polysiloxanes; which comprises adding said alkylalkenyldichlorosilane to a mixture of water and an aliphatic monohydric alcohol or an aliphatic ketone, as the hydrolysis medium; wherein the ketone is completely water soluble, miscible with the alkylalkenyldichlorosilane and with the cyclic polysiloxane product and contains only hydrogen, carbon, and oxygen atoms.

DESCRIPTION OF PREFERRED EMBODIMENTS

The alkylalkenyldichlorosilanes which are subjected to the hydrolysis process of the present invention are represented by the following formula:

(1)   $RR'SiCl_2$ wherein R is a lower alkyl group containing from 1 to 5 carbon atoms, and R' is a vinyl radical or allyl radical or methallyl radical. Examples of some suitable alkyl groups represented by R include methyl, ethyl, propyl, butyl, and pentyl. The preferred alkyl group is methyl. Preferably R' is vinyl.

Examples of some specific compounds represented by $RR'SiCl_2$ include methylvinyldichlorosilane, ethylvinyldichlorosilane, methylallyldichlorosilane, methylmethallyldichlorosilane, and n-butylallyldichlorosilane. The preferred dichlorosilane employed in the present invention is methylvinyldichlorosilane. Also, the alkylalkenyldichlorosilane should be substantially free of other types of hydrolyzable silanes.

The organic liquids employed in conjunction with water in the hydrolysis process of the present invention include the aliphatic ketones. The organic liquid must be completely soluble in water, must be miscible with the alkylalkenyldichlorosilane and with the cyclic polysiloxane product and usually contains only hydrogen, carbon, and oxygen.

Examples of suitable water soluble monohydric alcohols which may be employed in the present invention include methanol, ethanol, propanol, isopropanol, and ether alcohols such as ethylene glycol monomethyl ether, ethylene glycol monoethyl ether, ethylene glycol monobutyl ether, and the like.

Suitable aliphatic ketones which may be employed in the present invention include acetone and methyl ethyl ketone. The preferred organic liquids employed in the present invention are acetone and methanol.

The relative amount of water present must be sufficient to effect the desired hydrolysis as illustrated by the following formula:

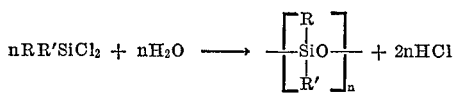

Preferably the volume ratio of water to dichlorosilane ranges between about 0.6:1 to 2:1, and particularly when it is desired to produce the tetramer such as sym-2,4,6,8-tetramethyl-2,4,6,8-tetravinylcyclotetrasiloxane as the predominant product, such as amounts at least about 50% and preferably at least about 60% by weight of the reaction product. More preferably the volume ratio of water of dichlorosilane ranges between 0.7:1 to 1.5:1, and most preferred is about 0.8:1.

Preferably, the volume ratio of organic liquid to water employed in the present process is about 0.5:1 to 1.5:1, and particularly when it is desired to produce the cyclic tetramer such as sym - 2,4,6,8 - tetramethyl-2,4,6,8-tetravinyltetrasiloxane as the predominant product such as amounts at least about 50% and preferably at least about 60% by weight of the reaction product. The most preferred volume ratio of organic liquid to water is about 1.25:1.

The reaction is conducted by placing the hydrolysis medium in a suitable reaction vessel and then adding the alkylalkenyldichlorosilane thereto. This sequence of adding the hydrolysis medium and silane is important for the successful operation of the present process. The particular sequence of addition is important in obtaining the desired high yields of the cyclic product. For instance, if the hydrolysis medium were added to the dichlorosilane, the formation of cyclic materials would be suppressed in favor of the formation of linear chains.

The rate of addition of the dichlorosilane can vary considerably depending upon the temperature to which the reaction medium is permitted to rise and dependent upon the efficiency and effectiveness of any heat transfer means employed to remove heat of reaction. The hydrolysis reaction is exothermic and heat is evolved during the reaction. Accordingly, the reaction is usually initiated at moderately low temperatures, for example, from about 0° C. to about 25° C. The temperature during the hydrolysis can be permitted to rise to reflux temperature. However, it is preferred to keep the temperature below 50° C. and most preferably between about zero and 40° C.

A major portion of the hydrogen chloride formed during the hydrolysis evolves as a gas from the product. Since the product is water immiscible it may readily be removed from the reaction medium. In addition, hydrogen chloride dissolves in the organic solvent whereby the solubility characteristics of the organic solvent are changed. For extremely pure products, the siloxane product may be washed with water to remove trace amounts of hydrogen chloride and organic liquid that may be present. Moreover when mixtures of cyclic products are formed, the individual cyclic polysiloxane can be isolated by such convenient methods as vacuum distillation. For example, 2,4,6,8-tetramethyl - 2,4,6,8 - tetravinylcyclotetrasiloxane is conveniently separated from a mixture of corresponding cyclic polysiloxanes by vacuum distillation at a pressure of 10 mm. of Hg at a temperature of 120–150° C.

The product obtained from the present invention corresponds to the formula:

(2) 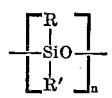

wherein R is a lower alkyl group containing from 1 to 5 carbon atoms, and R' is an alkenyl radical, and $n$ is an integer from 3 to 10 inclusive. Suitable alkyl groups represented by R include methyl, ethyl, propyl, isopropyl, butyl, and pentyl. Preferably R is methyl. Alkenyl radicals represented by R' include vinyl, allyl, and methallyl, and preferably vinyl. $n$ is preferably an integer from 3 to 7 inclusive and most preferably is 4.

Some examples of specific products prepared by the process of the present invention include 2,4,6-trimethyl-2,4,6 - trivinylcyclotrisiloxane; 2,4,6,8,10 - pentamethyl-2,4,6,8,10 - pentavinylcyclopentasiloxane; 2,4,6,8,10,12-hexamethyl - 2,4,6,8,10,12 - hexavinylcyclohexasiloxane; and preferably 2,4,6,8-tetramethyl - 2,4,6,8 - tetravinylcyclotetrasiloxane.

The following non-limting examples are provided wherein all parts are by weight unless the contrary is stated:

Example 1

To a reaction vessel equipped with a thermometer, stirrer, and condenser containing an HCl vent was added a solution of 400 parts of water and 400 parts of methanol. To this solution there was added with agitation 500 parts of vinylmethyldichlorosilane over a period of 4 hours. During this addition the temperature was maintained at 0° C. The mixture was then stirred for an additional ½ hour at which time 290 parts of the hydrolysis product separates out. The product was neutralized with 300 parts of 5% aqueous sodium bicarbonate solution and then washed with 300 parts of water. The product was analyzed by vapor phase chromatography and contains 252 parts of a mixture of cyclic polysiloxanes corresponding to the formula $[(CH_3)(C_2H_3)SiO]_n$ wherein $n$ is from 3 to 6, 195 parts of which are the methyl vinyl tetramer (2,4,6,8-tetramethyl-2,4,6,8-tetravinyl cyclotetrasiloxane). The yield from vinylmethyldichlorosilane of mixed cyclic materials of the above formula is about 82.5% and the yield of the specific methyl vinyl tetramer is 64%.

Example 2

To a reaction vessel equipped with a thermometer, stirrer, and condenser containing an HCl vent there was added a solution of 400 parts of water and 400 parts of methanol. To this solution there was added with agitation 500 parts of methylvinyldichlorosilane over a period of 4 hours. During this addition, the temperature was maintained at 36° C. This mixture was then stirred for another ½ hour at which time 290 parts of the hydrolysis product separates out. The product was neutralized with 300 parts of 5% aqueous sodium bicarbonate solution and then washed with 300 parts of water. The product was analyzed by vapor phase chromatography and contains about 261 parts of a mixture of cyclic polysiloxanes corresponding to the formula $[(CH_3)(C_2H_3)SiO]_n$ wherein $n$ is from 3 to 6, about 205 parts of which are the methyl vinyl tetramer (2,4,6,8-tetramethyl-2,4,6,8-tetravinylcyclotetrasiloxane). The yield from vinylmethyldichlorosilane of the mixed cyclic materials of the above formula is about 85.5% and the yield of the specific methyl vinyl tetramer is 67%.

Example 3

To a reaction vessel equipped with a thermometer, a stirrer, and a condenser containing an HCl vent there was added a solution of 2400 parts of water and 2400 parts of acetone. To this solution there was added with agitation 2400 parts of methylvinyldichlorosilane over a period of 3 hours. During this addition the temperature was maintained between 28 and 46° C. The mixture was then stirred for another ½ hour while maintaining the temperature at 46° C. After this, a product separated out which was neutralized with about 1350 parts of a 5% aqueous sodium bicarbonate solution and then washed with about 1350 parts of water The product was analyzed by vapor phase chromatography and contains 1353 parts of a mixture of cyclic polysiloxanes corresponding to the formula $[(CH_3)(C_2H_3)SiO]_n$ wherein $n$ is from 3 to 6, of which 1000 parts are the methyl vinyl tetramer (2,4,6,8-tetramethyl - 2,4,6,8 - tetravinylcyclotetrasiloxane). The yield from vinylmethyldichlorosilane of the mixed cyclic materials is about 93% and the yield of the specific methyl vinyl tetramer is 68%.

Comparison Example 4

To 1000 parts of water in a reaction vessel equipped with a thermometer, stirrer, and condenser containing an HCl vent there was added with agitation 200 parts of vinylmethyldichlorosilane over a period of 1 hour. The temperature was maintained at room temperature during the addition of the chlorosilane. The mixture was then stirred for an additional ½ hour after which the product was separated. The product was neutralized with about 120 parts of 5% aqueous sodium bicarbonate solution and then washed with about 120 parts of water. The product was analyzed by vapor phase chromatography and contains only 42.6% of mixed cyclics corresponding to the formula $[(CH_3)(C_2H_3)SiO]_n$ wherein $n$ equals 3 to 6.

Comparison Example 5

A solution of 216 parts of vinylmethyldichlorosilane in 400 parts of normal hexane was added to 100 parts of water with agitation in a reaction vessel equipped with a thermometer, stirrer and condenser containing an HCl vent. The temperature of the addition was maintained at room temperature. After this, the mixture was stirred for an additional ½ hour. The product was then separated, neutralized with about 120 parts of 5% aqueous solution of sodium bicarbonate and washed with about 120 parts of water. The normal hexane was then distilled off by heating to 69° C. The product was analyzed by vapor phase chromatography and contains 51.4% of mixed cyclics corresponding to formula $$[(CH_3)(C_2H_3)SiO]_n$$

wherein $n$ is from 3 to 6.

As evident from the examples, the present invention provides a process whereby exceptional yields of desired product are obtained in a very safe and relatively inexpensive manner.

It has previously been suggested to employ certain quantities of certain alcohols to produce either hexaethylcyclotrisiloxane (U.S. Pat. 2,769,830 to Dobay) or octaethylcyclotetrasiloxane (U.S. Pat. 2,769,829 to Dobay). U.S. Pat. 2,769,830 to Dobay discloses that the water must be present in an amount of 3 parts to 9 parts by volume per part of alcohol to obtain the hexaethylcyclotrisiloxane in large quantities. In addition, this patent discloses that the hydrolysis of the diethyldichlorosilane with the medium comprising the critical amounts of water and the alcohol to yield substantially only hexaethylcyclotrisiloxane is not applicable to the hydrolysis of other hydrocarbon substituted chlorosilanes. U.S. Pat. 2,769,829 discloses the preparation of octaethylcyclotetrasiloxane by hydrolysis in a medium containing by volume from 3 parts of alcohol to 6 parts of alcohol per part of water. Like the disclosure of 2,769,830, this patent also states that the hydrolysis set forth therein is not applicable to the hydrolysis of hydrocarbon substituted chlorosilanes other than diethyldichlorosilane. However, contrary to the teachings of Dobay, the present invention can employ an alcohol to provide significant quantities of the desired cyclic polysiloxanes and particularly 2,4,6,8-tetramethyl-2,4,6,8-tetravinyltetrasiloxane.

What is claimed is:

1. Process for preparing cyclic sym-polyalkylpolyalkenylpolysiloxane having the formula:

(1) 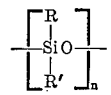

wherein R is a lower alkyl group containing from 1 to about 3 carbon atoms, R' is selected from the group of vinyl, allyl, and methallyl radicals, and $n$ is an integer from 3 to 10 inclusive, by the hydrolysis of an alkylalkenyldichlorosilane having the formula:

(2)         RR'SiCl$_2$ wherein R and R' have the same meaning as defined above which comprises adding said alkylalkenyldichlorosilane to a mixture of water and an organic liquid selected from the group of aliphatic monohydric alcohols, aliphatic ketones, and mixtures thereof, as the hydrolysis medium; and wherein said organic liquid is completely water soluble, is miscible with the alkylalkenyldichlorosilane, and with said cyclic-sym-polyalkylpolyalkenylpolysiloxane and contains only hydrogen, carbon, and oxygen atoms.

2. The process of claim 1 wherein R' is vinyl and the product contains at least about 50% by weight of the cyclic tetramer.

3. The process of claim 1 wherein the volume ratio of water to dichlorosilane is about 0.6:1 to 2:1.

4. The process of claim 1 wherein the volume ratio of organic liquid to water is about 0.5:1 to 1.5:1.

5. The process of claim 1 which is carried out at a temperature below about 50° C.

6. The process of claim 1 wherein said organic liquid is methanol or acetone.

7. The process of claim 1 wherein said alkylalkenyldichlorosilane is methylvinyldichlorosilane and wherein said polysiloxane contains at least about 50% by weight of sym-tetramethyltetravinylcyclotetrasiloxane.

8. The process of claim 7 wherein the volume ratio of organic liquid to water is about 0.5:1 to 1.5:1; and the volume ratio of water to dichlorosilane is about 0.6:1 to 2:1.

9. The process of claim 7 wherein said organic liquid is acetone or methanol.

10. The process of claim 7 wherein said organic liquid is methanol, the volume ratio of water to dichlorosiloxane is about 0.8:1, the volume ratio of methanol to water is about 1.25:1, and the reaction is carried out at a temperature between about zero and 40° C.

References Cited
UNITED STATES PATENTS

| 2,769,829 | 11/1956 | Dobay | 260—448.2 E |
|---|---|---|---|
| 2,769,830 | 11/1956 | Dobay | 260—448.2 E |
| 3,398,173 | 8/1968 | Goossens | 260—448.2 E |
| 3,432,538 | 3/1969 | Curry | 260—448.2 E |
| 3,484,468 | 12/1969 | Curry | 260—448.2 E |
| 3,546,265 | 12/1970 | Schank | 260—448.2 E |
| 3,607,898 | 9/1971 | Macher | 260—448.2 E |
| 3,627,805 | 12/1971 | Thomas et al. | 260—448.2 E |

DANIEL E. WYMAN, Primary Examiner

P. F. SHAVER, Assistant Examiner